Figure 1:
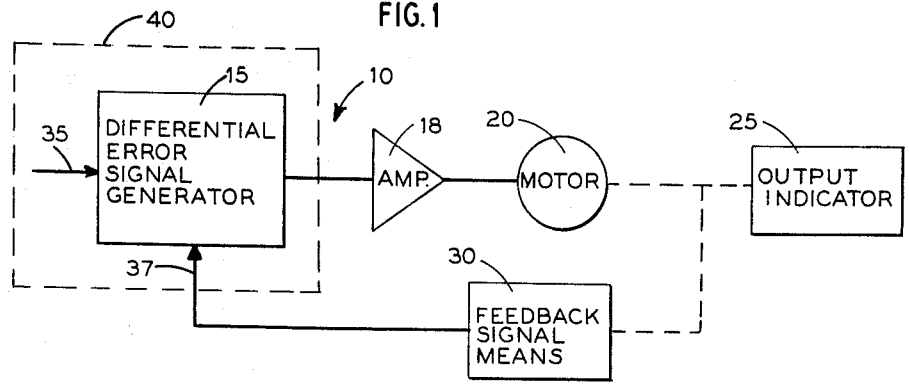

April 19, 1966  S. KASE  3,247,431
SERVO SYSTEMS
Filed Nov. 30, 1962

INVENTOR.
Schuyler Kase
BY
ATTORNEY

United States Patent Office 3,247,431
Patented Apr. 19, 1966

3,247,431
SERVO SYSTEMS
Schuyler Kase, 112 Parise Road, Pittsburgh 21, Pa.
Filed Nov. 30, 1962, Ser. No. 241,331
8 Claims. (Cl. 318—28)

This invention relates to analog servo systems and their various sub-families, and particularly to the elements for developing a differential error signal at the input of various types of amplifiers used in analog servo systems and their various related sub-families.

In a positional servo loop, the function of the servo loop is to produce an output effect, as a voltage or as a movement of a shaft, for example, that will be proportional or representative of an input voltage supplied to the loop as a characteristic or proportional value that is functionally related to an external condition that is to be maintained or controlled, or that is related to an external value, for example, that is to be measured.

In the generalized servo loop, a comparison is made between the feed back quantity and the input quantity in order to derive some indication of how closely the output of the loop is following and corresponding to the quantity that is injected into the loop for amplification and control of some specific load.

The nature of the comparison between the input quantity and the output quantity of the loop is such as to vectorially add the two quantities (any number of quantities can be used) in order to derive a difference or net quantity which will then correspond to a deviation which is used to control the output quantity to its proper value. Such a comparator is therefore essentially a vector addition device or differential device for deriving the difference quantity which is usually referred to as the error signal. Such error signal is therefore the actual guiding and controlling force which controls an amplifier to operate the feed back device which is to control or to govern the control for the output or load which the servo loop is to control.

This invention is directed to the error signal generator that represents the input to the amplifier of the servo.

In designing a servo for proper operation with its related system, a so-called equation of motion is formulated which will describe and characterize the operation of the servo loop. The several terms of such an equation generally represent variable quantities that are respectively functions of a quantity that is to be measured or controlled. In such an equation, if all the terms be moved to the left-hand side of the equality sign, the right-hand side of the equation reduces to zero. That represents a condition where all of the terms of the equation vectorially add up to zero. $(K_1A + K_2B + K_3C = 0)$ Such an equation essentially represents all of the quantities or forces as injected into or supplied to the differential error signal generator as the input to the amplifier of a servo loop. The terms normally on the left-hand side of the equation represent certain functions of various quantities in the system which must be treated in accordance with the function terms to achieve the type of control desired in the device that is to be regulated and controlled and that corresponds essentially to the load which the servo system is to control.

In order to achieve such control of the load device, certain mathematical functions are generated corresponding to the several terms of the equation of motion for the system. The servo loop then operates in a manner to maintain the conditions in the system such that the prescribed equation of motion will be maintained as originally set up, and therefore solved.

It has been conventional practice to establish a value corresponding to the value of each term of such equation by generating a voltage corresponding to the value of such term. The sum of such voltages with appropriate polarities would add up to zero, so long as the controlled conditions of the system being servo'd corresponded to the predetermined conditions set up for the servo loop. Any deviation from such predetermined set of conditions would then generate the error signal as a measure of the deviation. The polarity of the error signal would then indicate whether the deviation was in one direction or the other, and would thus serve to control the servo loop in the appropriate direction to cause a restoration of the system to the desired or proper condition.

In such conventional general practice, the function generators utilized to generate such voltages corresponding to the terms of the equation of motion have been variable voltage transducers. A movable element on each such transducer was controlled by a suitable motive means in accordance with a measurement of a quantity which constituted one of the terms of the equation. The equation of motion is solved by the servo differential signal generator or summing network. The summing network is usually made from a series of fixed resistors.

These resistors were usually precision wire-wound and accurately matched in characteristics, but nevertheless introduced many inaccuracies. The resistance values of the individual resistors would change in an individually different pattern due to temperature. Also, each resistor would have a different phase shift condition from its companion resistor. A trimming capacitor or resistor would be employed to compensate for that different phase shift, but the response of the capacitors or resistors under different temperature conditions and operating conditions would then again vary, depending upon the harmonic content of the power supply for the servo loop. Moreover, the absolute values of the resistors would drift with time. There is also a decided limit to the ability to match the resistors for resistance. A further disadvantage arose from the nature of the circuitry which permitted interaction between the voltages across the individual resistors. There was no isolation possible between those voltages. It therefore has been necessary to employ resistors of high values, with a consequent collateral need of high-impedance amplifiers, since the amplifier must be then driven from a high-impedance source represented by the output of the resistive summing network.

In accordance with the present invention, instead of using summing resistors in accordance with the conventional practice, summing transformers are employed. The primary windings of the respective transformers are energized in accordance with a voltage that is a function of the value of each term of the equation of motion, and the secondary winding of the transformer generates a corresponding voltage. Thus, for example, where the equation of motion includes three terms, three transformers will be employed and the three secondaries will be connected in series, thereby establishing a vector voltage summation of the voltages imparted to the transformers.

Each transformer has a resistor connected across its secondary windings. These resistors do not enter into the vector summation. Their purpose is to maintain the input impedance of the transformer essentially constant with input voltage from zero volts to the saturation voltage of the transformer. The effect of these resistors is most pronounced when the transformer core material has a high initial permeability. The exact value of this resistance is determined by the equivalent core resistance, turns ratio, and inductive reactance of each transformer.

For extreme accuracy of operation, the transformers have a step down voltage ratio (all ratios need not be equal) to eliminate the effects of minor variations of the magnetic characteristics of the magnetic materials used in the cores. This step down ratio is many times less than the resultant reduction of output impedance of the network with the resultant effect of the need for less amplifier gain when compared with an equivalent resistive network.

The core material is toroidal in structure with no air gaps. Therefore, the basic phase shift through any transformer is theoretically zero. (The same) In order to compensate for the practical effects of winding capacity, winding leakage, driving source impedance, leakage reactance, cable capacitance, and other variables, another resistor is used in parallel with the output of this device to essentially short out the voltages generated by the above effects. This resistor does not affect the vector summation of the voltages being summed.

As previously explained in connection with the voltage generators of conventional practice, the secondary windings of the transformers will be so connected that the vector addition of those voltages will add up to zero when the conditions in the system to be controlled are proper. When those conditions deviate from such reference condition, a voltage difference will be generated across the output of the transformer circuit, and such voltage will constitute the deviation voltage or error signal available to initiate operation of the servo loop.

Figure 2:
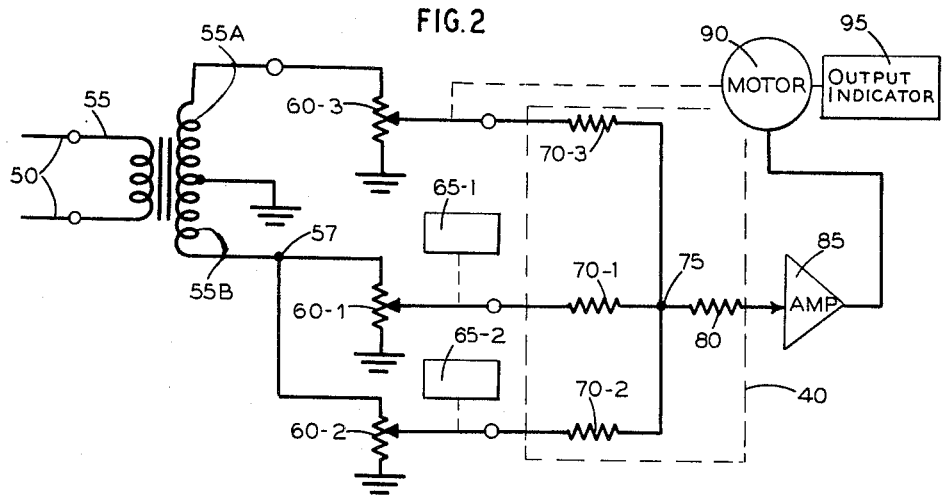
Figure 3:
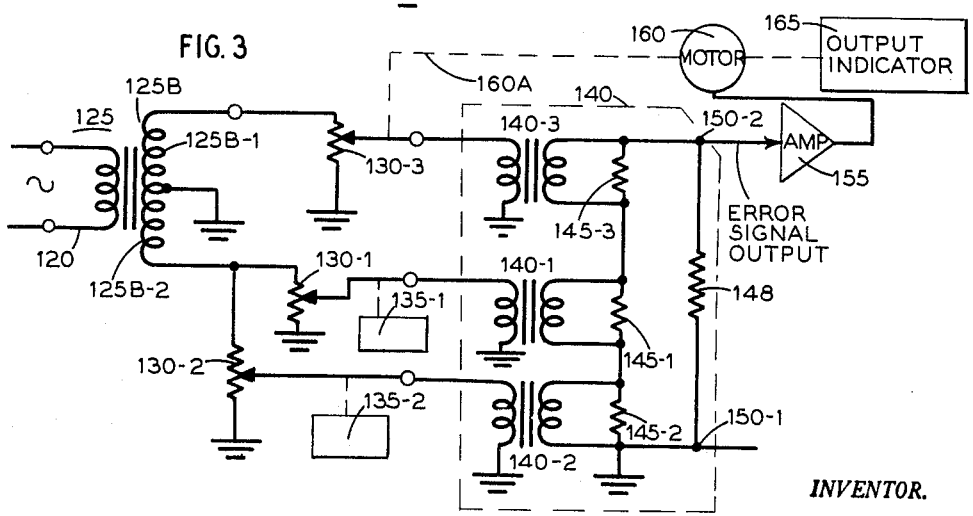

The manner in which the system is arranged in a servo loop, in accordance with the principles of this invention, is explained in the following specification, in connection with the accompanying drawings, in which FIGURE 1 is a schematic block diagram of a generalized positional servo loop such as has been used in the prior art;

FIGURE 2 is a schematic circuit diagram of the portion of the block diagram in FIGURE 1 enclosed in the broken line rectangle and representing the input to the differential error signal generator, and feed back voltage supplied thereto for generating another input to the differential error signal generator representative of the prior art practices;

and FIGURE 3 is a circuit diagram similar to that in FIGURE 2 illustrating how the transformers are employed instead of the conventional resistors, to achieve the benefits of the present invention. That portion of FIGURE 3 enclosed in dotted lines is a schematic of the present invention.

As shown in FIGURE 1, the generalized positional servo loop 10 is shown as comprising a differential error signal generator 15, an amplifier 18, a motor 20, output controls 25 and a feed back signal means 30.

In the operation of the servo loop 10, an input signal represented by the arrow 35 is fed into the error signal generator 15. A feed back signal from the feed back signal means 30 and represented by the arrow 37 is also supplied to the error signal generator. The operation of the error signal generator 15 is such as to add vectorially the input signal 35 and the feed back signal 37. Those two signals 35 and 37 are arranged to be vectorially additive. When those two signals 35 and 37 are equal in magnitude or substantially equivalent in their effect, depending upon the nature of the error signal generator, their difference or differential effect is zero, so that no signal flows from the signal generator 15 through the connection indicated to the amplifier, and therefore no signal proceeds from the amplifier to the motor 20. Consequently, the motor 20 is not operated to change the output indication 25, since the feed back signal through the signal feed back means 30 indicates that the condition that would be controlled by the motor 20 is such as to correspond to the condition represented by the input voltage 35, and no action is therefore required from the motor.

When the input signal 35 and the feed back signal 37 are not the same or equal or equivalently effective, a differential voltage is generated which represents then the error signal from the generator 15 which is transmitted to the amplifier 18 and there amplified to energize the motor 20 to establish an influencing or operating force on the output indicator 25 that will tend to establish an external condition in the controlled apparatus that will represent correspondence with the condition represented by the input voltage 35. Until that condition of correspondence is established between the input voltage 35 and the feed back signal from signal means 30, the differential error signal generator 15 will generate an output error signal which will determine whether and when the input signal and the corresponding feed back signal 37 are equal or equivalently effective in the generator 15.

This generalized positional servo loop thus acts as a continuously active comparator and amplifier for controlling some external apparatus or device through the output indications in accordance with the command signal of the input reference voltage.

The part of the servo loop enclosed in the broken line box 40 of FIGURE 1 represents the particular area of activity to which the present invention is pertinent.

As shown in FIGURE 2, the servo loop 10 of FIGURE 1 is shown in partial diagrammatic form, to the extent of illustrating the operation of the differential error signal generator included in the block 15 of FIGURE 1.

As shown in FIGURE 2, an external reference voltage is applied to the primary winding of a transformer 55 whose secondary winding is subdivided into two portions 55A and 55B, with the midpoint of the secondary grounded. The bottom terminal 57 of the portion 55B serves as a point of voltage from which one or a plurality of voltage transducers 60–1, 60–2, etc. may be energized. Each of these voltage transducers 60–1, etc. is arranged to provide a variable output by the movement of an external control device 65–1, etc. in accordance with a quantity that is measured as representative of one of the terms of the equation of motion set up for the servo loop and the system that it is to control. The block 65–1 represents all of the devices including instrumentation and equipment appropriately arranged to respond to the various operations of the system that is to be controlled in order to produce a movement in a movable element such as an instrument that is functionally related to the condition in the main system that is to be controlled. Thus, the voltage taken from the voltage transducer 60–1 by the movable output represents the value of one term of the equation of motion. Similarly, the voltage taken off by the movable output on the voltage transducer 60–2 represents another term of that equation.

The voltage taken off by the movable output from the voltage transducer 60–3 represents the feed back voltage that serves as an output comparison voltage that is utilized in the summing circuit for comparison with the sum of the two voltages taken from the two voltage transducers 60–1 and 60–2.

The voltages from the three voltage transducers 60–1, 60–2 and 60–3 are impressed upon three associated resistors 70–1, 70–2 and 70–3 with their output terminals joined at a node 75 which is coupled through a resistor 80 to an amplifier 85 which drives a motor 90 for operating certain output indications 95 whose operating condition must be maintained as the basic function and purpose of the servo loop in this figure.

The motor 90 also controls the position of the movable output of the voltage transducer 60–3 to determine the value of the feed back signal with which the input voltages from the two voltage transducers 60–1 and 60–2 are to be compared.

It will be obvious that since the voltages from the three voltage transducers 60–1, 60–2 and 60–3 are to be compared, by means of the potential drops across the associated resistors 70–1, 70–2 and 70–3, the voltage transducers and the associated resistors must have an extremely high degree of accuracy in their values. In addition to such accuracy in construction, the resistors must be very closely similar, all of which leads to expensive units that are difficult to make.

In accordance with the principles of this invention, a control system is provided as shown in FIGURE 3, and in particular, block 140.

As shown in FIGURE 3, a power supply 120 energizes the primary winding of a transformer 125 to provide a predetermined voltage, according to design, on the secondary winding. The secondary winding 125B is divided into two sections, 125B-1 and 125B-2.

The section 125B-1 provides a source voltage for two voltage transducers 130-1 and 130-2 that are provided with variable output elements that are arranged to be controlled by instrumentation control devices 135-1 and 135-2 respectively, in accordance with certain quantities that represent mathematical terms of the equation of motion for the servo loop and the associated equipment.

The voltage developed across the voltage transducer 125B-2 is opposite in phase to the voltages across the other two voltage transducers 130-1 and 130-2. The voltages may thus be directly compared and utilized by the differential signal generator for the generation of an error signal.

To achieve such comparison, the voltage taken from the voltage transducer 130-1 is supplied to the primary winding of a transformer 140-1 whose secondary winding is bridged by a resistor 145-1.

In similar manner, the voltage from the variable output of the voltage transducer 130-2 is similarly supplied to the primary winding of a transformer 140-2 whose secondary is bridged by a resistor 145-2.

Similarly, the voltage from the feed back voltage transducer 130-3 is supplied to the primary winding of a transformer 140-3 whose secondary winding is bridged by a resistor 145-3.

The voltages across the three resistors 145-1, 145-2 and 145-3 should balance out to zero between the two output terminals 150-1 and 150-2 when the input voltage and the feed back voltage of the servo loop correspond and indicate a proper condition in the system controlled by the loop.

When the condition of the controlled equipment deviates from the instantaneous proper condition or value, an error signal will be generated at the top electrode 150-2 which will then go to an amplifier 155 whose output will be supplied to the operating motor 160 for controlling the feed back voltage which in turn varies the external indication to establish a condition corresponding to that of the reference condition, thereby indicating that a command of the input signal has been obeyed. The mechanical connection 160-A represents a mechanical coupling for driving the variable output element of the voltage transducer 130-3 to establish the feed back voltage on the transformer 140-3 which indicates the instantaneous then condition of the external equipment being controlled by the motor 160, so that an error signal at the terminal 150-2 will be generated or not generated according to whether there is lack of correspondence between the input and the output conditions or whether there is correspondence.

Transformers 140-1, 140-2 and 140-3 can be readily designed, since their proper function depends upon the relation of the turns ratio between the primary and the secondary windings, so long as the iron core is held below saturation.

The three output resistors 145-1, 145-2 and 145-3 do not require to be accurate resistors, nor does the error scaling resistor 148 require any accuracy.

Thus, by use of the transformer whose outputs can be controlled by the ratios of the primary and secondary windings, the need for extremely accurately made resistors is eliminated and accuracy is achieved in a much simpler manner.

Thus, the arrangement herein disclosed, which utilizes the transformers and their output resistors, preferably coupled with an error scaling resistor to develop a resultant error signal when one exists, provides a very simple control circuit for a servo loop that may be easily and readily designed to achieve the characteristic functions required of that loop.

The invention is not necessarily limited to the number of control units shown, nor to the specific arrangement of the circuitry that is indicated, since various modifications may be made within such arrangement without departing from the spirit and scope of the invention as set forth in the appended claims, nor does the servo necessarily need to have any mechanical motion or output indicators.

What is claimed is:

1. A magnetic control circuit for a servo loop comprising
   a plurality of electromagnetic transformers having primary and secondary windings;
   individual resistance means connected across each secondary winding;
   means connecting said resistance means in a series circuit including an error scaling output resistor bridging said resistance means in series to develop a net signal output voltage across said error scaling output resistor corresponding to the vector sum of the voltages across said individual resistance means;
   and means for taking off said signal output voltage from said error scaling output resistor.

2. A magnetic control circuit for deriving a net error signal voltage for use in a servo loop, comprising
   a voltage transducer for generating a variable voltage corresponding to a variable quantity to be controlled;
   means for generating an output voltage;
   means for combining the variable voltage and the reference output voltage differentially to derive a net difference or error voltage, said combining means including
      transformer means responsive to said variable voltage,
      transformer means responsive to said output voltage,
      separate resistance means energized from each of said transformer means to generate individual voltages related to said variable and said output voltages, respectively,
      and output resistance means energized from all of said separate resistance means in accordance with the net vector sum of the voltages across said separate resistance means.

3. A magnetic control circuit for deriving an error signal voltage for use in a servo control loop, comprising
   means for generating a variable voltage corresponding to a measure of a variable quantity to be controlled;
   means for generating an output voltage corresponding to a measure of said quantity to be measured;
   separate resistance means energized, respectively, in accordance with each of said voltages;
   means combining said resistance means in a common circuit to derive a net vector sum of the voltage drops across said resistance means;
   means responsive to said net vector sum to establish a net error signal;
   and means responsive to said net error signal for controlling said output voltage.

4. In a servo loop, an error signal generator comprising
   a source of A.C. voltage;
   a transformer having a primary and a secondary winding, with its primary energized from said source to provide a reference voltage source at the secondary winding;
   means energized from said reference voltage source for generating a first voltage function related to a quantity to be measured;
   and means energized from said reference voltage source for generating a second voltage function related to said quantity to be measured.

5. In a servo loop system, having an input end and an output end, the combination with a plurality of voltage function generators responsive to function control devices, and a voltage function generator responsive to a feed back action from the output end of the loop,
of means comprising a plurality of transformers energized from said voltage function generators;
and means for vectorially adding the voltages from said transformers to derive a resultant voltage as a net differential error signal to activate the servo loop.

6. An error signal generator for a servo loop, comprising
a transformer having a primary winding energized from an alternating voltage source and having a secondary energized to provide two output terminals of opposite polarity and equal voltage relative to a grounded mid-point;
a plurality of voltage function generators energized from one of said transformer output terminals and controlled respectively in accordance with functions related to quantities to be measured and controlled;
a single voltage function generator energized from the other of said transformer output terminals and controlled according to an output function of the servo loop;
and means for vectorially adding the voltage functions from said plurality of function generators and from said single generator to derive a vector resultant voltage as a differential error signal to activate the servo loop.

7. An error signal generator for a servo loop, comprising
a plurality of transformers each having a primary winding and a secondary winding, one transformer primary to be energized by a voltage that is a function of the output of such servo loop, and the other primary windings to be respectively energized by individual voltages that are respectively functions of quantities representative of operations in a system to be controlled by the servo loop;
a resistor bridging each secondary winding;
and means connecting the several resistors in series between two output terminals, to provide a resultant vector value of the several voltages in the series resistor circuit.

8. An error signal generator for a servo loop, as in claim 7, including additionally,
an output resistor connected between said two output terminals.

References Cited by the Examiner

UNITED STATES PATENTS

| | | | |
|---|---|---|---|
| 2,450,084 | 9/1948 | Emerson | 318—28 |
| 2,698,406 | 12/1954 | Arrott | 318—28 |

JOHN F. COUCH, *Primary Examiner.*